US007999012B2

(12) United States Patent
Lamphere et al.

(10) Patent No.: US 7,999,012 B2
(45) Date of Patent: Aug. 16, 2011

(54) FLUID BASED DECOMMISSIONING AND RECYCLING OF PRINTER TONER CARTRIDGES

(76) Inventors: Lacee Lamphere, El Paso, TX (US); Brian Ibarra, El Paso, TX (US); Donald Laffler, El Paso, TX (US); James Hardin, Santa Tetresa, NM (US)

( * ) Notice: Subject to any disclaimer, the term of this patent is extended or adjusted under 35 U.S.C. 154(b) by 305 days.

(21) Appl. No.: 12/254,210

(22) Filed: Oct. 20, 2008

(65) Prior Publication Data

US 2009/0103942 A1 Apr. 23, 2009

Related U.S. Application Data

(60) Provisional application No. 60/981,775, filed on Oct. 22, 2007.

(51) Int. Cl.
*C08J 11/04* (2006.01)

(52) U.S. Cl. ............. 521/45; 521/40; 521/40.5; 521/41; 521/45.5; 521/47; 528/480; 528/499; 528/502 R; 528/502 F; 209/8; 209/12.2; 209/13; 209/38; 209/39; 209/233; 209/245; 209/268; 209/606; 209/645; 347/3; 347/85; 347/86

(58) Field of Classification Search .................... 521/40, 521/40.5, 41, 46, 47, 47.5, 48, 49, 49.8, 45, 521/45.5; 528/480, 499, 502 R; 209/3.1, 209/3.2, 8, 12.2, 13, 16, 17, 18, 38, 39, 40, 209/44, 44.1, 606, 636, 638, 639, 645, 233, 209/241, 244, 245, 268; 347/3, 85, 86
See application file for complete search history.

(56) References Cited

U.S. PATENT DOCUMENTS

| | | | | |
|---|---|---|---|---|
| 5,465,847 | A * | 11/1995 | Gilmore | 209/12.1 |
| 2003/0141225 | A1 * | 7/2003 | Liddle et al. | 209/18 |
| 2004/0035757 | A1 * | 2/2004 | Vandeputte | 209/44 |
| 2007/0187299 | A1 * | 8/2007 | Valerio | 209/12.1 |

FOREIGN PATENT DOCUMENTS

JP 2004-191879 * 7/2004

OTHER PUBLICATIONS

Machine translation of JP 2004-191879.*

* cited by examiner

*Primary Examiner* — James Seidleck
*Assistant Examiner* — Frances Tischler
(74) *Attorney, Agent, or Firm* — Michael Ries

(57) ABSTRACT

Disclosed is a system to mechanically destroy printer toner cartridges and reclaim their constituent materials under a water shielded environment while providing a safer and more environmentally friendly recycling system. The present invention is an economical system that provides greater protection from possible fire or explosion and releases less irritating or possibly harmful airborne contamination than the currently available systems.

9 Claims, 2 Drawing Sheets

FLUID BASED DECOMMISSIONING AND RECYCLING OF PRINTER TONER CARTRIDGES

This application claims priority to U.S. Provisional Application 60/981,775 filed 22 Oct. 2007, the entire disclosure of which is incorporated by reference.

TECHNICAL FIELD AND BACKGROUND

The present invention relates to a system to mechanically destroy printer toner cartridges and reclaim their constituent materials under a water shielded environment to provide a safer and more environmentally friendly recycling system. More specifically an economical system is disclosed that provides greater protection from possible fire or explosion and releases less irritating or possibly harmful airborne contamination than the currently available systems.

Printer toner cartridges are made from materials that are economically recyclable. Currently, one method used to recycle the cartridges demolishes them by grinding and the resultant regrind material is separated or sorted into several salvage categories. The material categories generally include structural and non-structural plastics, toner, steel and aluminum. When separated into these categories, the salvaged materials can generally be sold to various recyclers at a price sufficient to economically support the salvage operations.

Recycling of printer toner cartridges is moderately hazardous due to two conditions that can result primarily from handling or processing toner during the recycling operations. Toner consists of a combination of carbon and certain plastics reduced to a very finely divided powder. Fine powder, if it is flammable, can become airborne and when airborne it can be more easily ignited and it can be inhaled by exposed personnel.

One hazard results from the toner being flammable, or explosive. This hazard requires the toner to be exposed to a suitable ignition source while in a combustion supporting atmosphere. This is most easily accomplished when airborne and finely ground materials are subject to becoming airborne when disturbed.

The toner materials are believed to be no-toxic to humans, however, they may become airborne as stated above. It has been shown that breathing even seemingly inert materials that are finely ground may result in various undesirable health issues. Therefore, a second hazard can result if operators or other personnel are exposed to airborne materials released from the handling and grinding operations.

Currently, some processors have ignored the problems (they believe the risks to be acceptable). Other processors, who want to accept less risk, have operated their processes in an isolated area or in some form of inert atmosphere.

It is an objective of this invention to describe a novel non-flammable fluid based method of recycling that is safe and that is more environmentally friendly and that can be more economically implemented than existing recycling systems. It is understood that the method described may have many applications and that describing it for recycling printer toner cartridges is for illustration purposes and is not intended as a limit of its utility.

This invention relates to improvements in the art of safely recycling products, that contain certain types of hazardous materials, by smashing, shredding, grinding and so forth. By way of example, it is desired to demolish printer toner cartridges by grinding. The cartridges may contain various amounts of toner which may be hazardous. The toner could become airborne and, under certain conditions, ignite and cause a fire or explosion or be inhaled by personnel, during the processing.

The present invention uses water or other suitable non-flammable fluid to suppress the chance of fire or explosion. While the description uses water as the fluid of choice, it is understood that other non-flammable fluids may be preferred for certain applications.

The present invention includes the use of mostly commercially available materials and equipment, which are so arranged and configured as to achieve the desired objective. The basic functions are performed by the following elements:

(1) Infeed hopper and conveyor
(2) Combination shredder/grinder
(3) Oscillating screen
(4) Flotation separator and wiper(s)
(5) Outfeed conveyor
(6) Ferrous metal separators
(7) Non-ferrous metal separator
(8) Non-metallic separator
(9) Material driers
(10) Storage/transport containers These functional elements may be enclosed in a suitable chamber that contains moisture released in the process and isolates personnel from any unnecessary exposure. The containment chamber is preferably constructed from strong and fireproof materials that are not degraded by water or other fluid selected for use in the process. The process starts with printer cartridges dumped into the infeed hopper and finishes with materials separated by type and size being dumped into suitable storage/transport containers.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase “in one embodiment” is used repeatedly. The phrase generally does not refer to the same embodiment, however, it may. The terms "comprising", "having" and "including" are synonymous, unless the context dictates otherwise.

Figure 1:
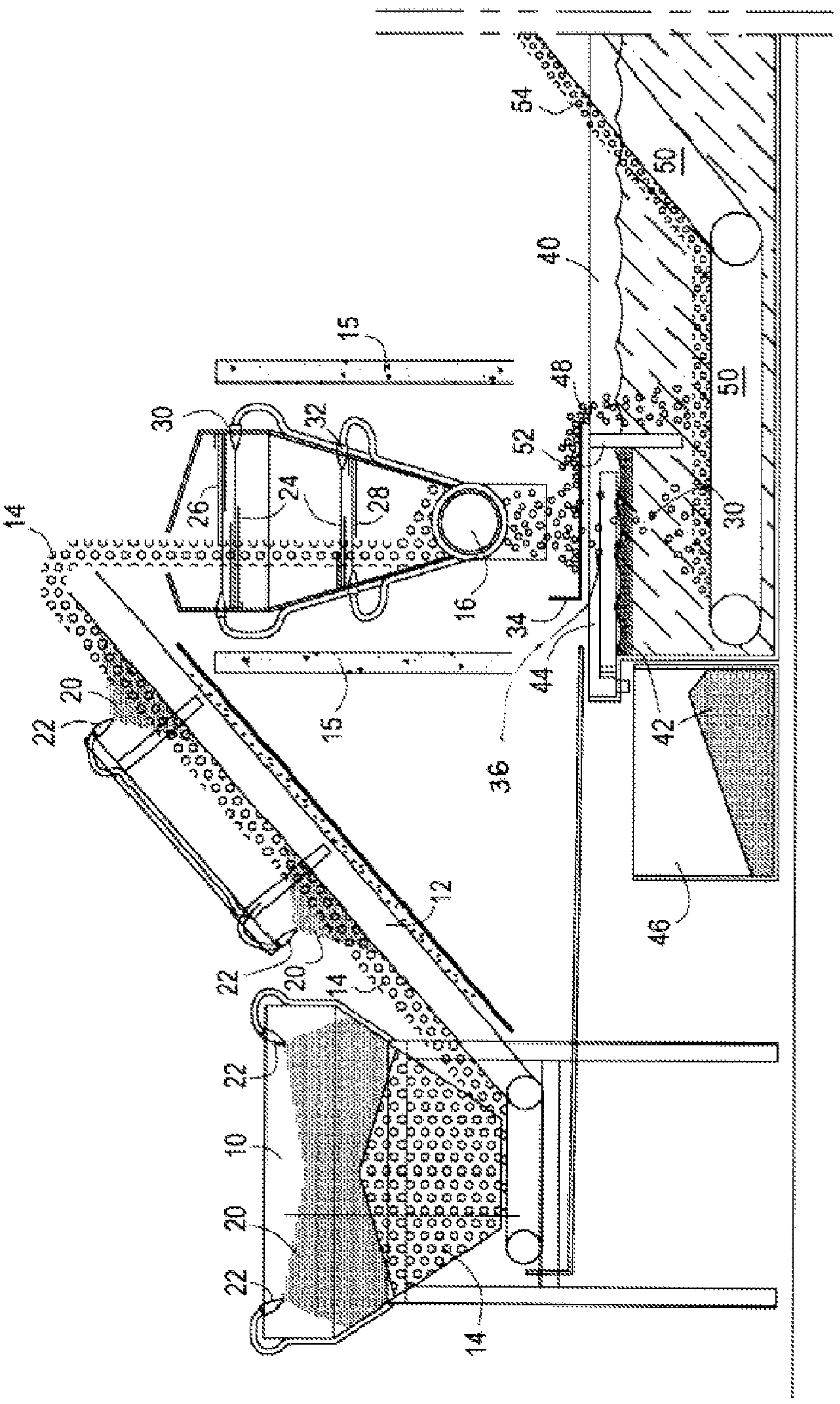
FIG. 1 is a drawing of recycling printer cartridges of one embodiment of the present invention.
Figure 2:
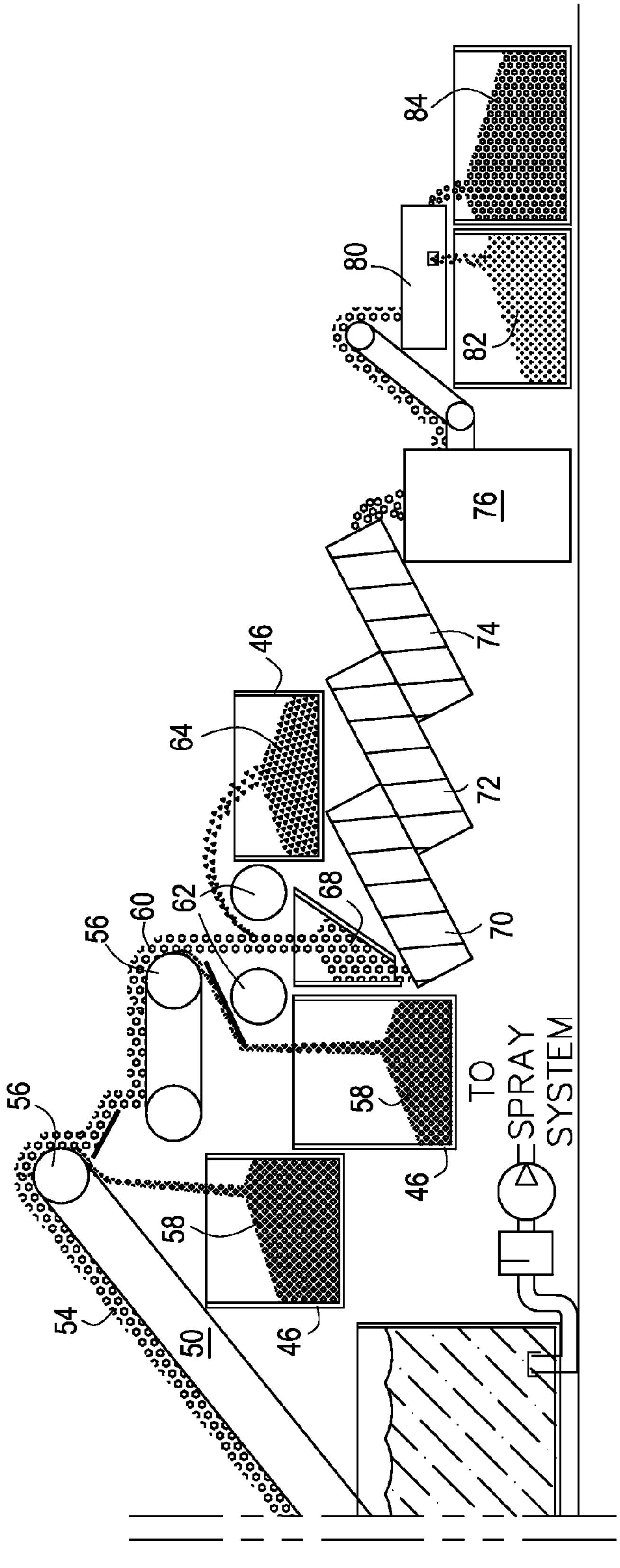
FIG. 2 is a drawing of recycling printer cartridges of one embodiment of the present invention.

Referring to FIGS. 1 and 2, as in one embodiment is an infeed hopper 10 and infeed conveyor 12 receive cartridges 14 and deliver them to a shredder/grinder 16. The cartridges 14 in the infeed hopper 10 and conveyor 12 are bathed by a water mist/spray 20 provided from spray/mist nozzles 22. The water spray/mist 20 controls the release of contaminants from the cartridges 14 into the atmosphere that would otherwise arise from the handling and moving operations.

In FIGS. 1 and 2, as in one embodiment of the present invention shown is the infeed conveyor 12 that dumps the cartridges 14 into the shredder/grinder 16 through a double water curtain 24. The water curtain 24 has an upper water curtain 26 with two water curtain nozzles 30 one above the other. The water curtain 24 has a lower water curtain 28 with two water curtain nozzles 32 one above the other. The water curtains 24 prevent any contaminants released by the grinding operation from being released into the atmosphere. The shredder/grinder 16 grinds all cartridge components into particles no larger than ⅜ inch. The grinder 16 is surrounded by an isolation chamber 15.

The material from the grinder 16 is dumped through an oscillating screen 34 that sorts materials into two or more sizes. The fine materials 36, that pass through the screen 34, are delivered into a flotation tank 40 which floats the light weight materials 42 (principally toner). The floating material 42 is regularly wiped or skimmed 44 into a storage/transport container 46. The larger and heavier materials 48 are regularly dumped from the sieve/screen 34 onto an outfeed conveyor 50, along with any heavy particles 30 that pass through the sieve 34 and sink to the bottom of the flotation tank 40. The heavier materials 48 and the fine materials 36 have a sluice gate 52 separating the materials.

The flotation separator is constructed in the tank 40 with suitable sluice gates or baffles 52 to isolate floating materials from non-floating materials. The tank is also constructed to accommodate one end of the outfeed conveyor 50 used to remove the larger materials 48 from the oscillating screen 34 as well as the materials that sink to the bottom of the tank. The floating materials (mostly toner) are regularly skimmed or wiped into a suitable storage/transport container 46.

In FIG. 2, as in one embodiment, the outfeed conveyor 50 transports the larger and heavier materials 48 to several material separators. These materials are normally wet from preceding operations; however, water may be dispensed if necessary along the conveyor. The material on the outfeed conveyor at this point is plastics, ferrous metal and non ferrous metal 54.

The ferrous metal components 58 are separated by means of one or more magnetic assemblies 56 through which the materials on the outfeed conveyor 50 are passed. The magnetic assemblies 56 may be a magnetic head or rare earth head. The separated metals 58 are dried if necessary and delivered to suitable storage/transport containers 46.

The materials that have passed through the ferrous metal separators 60, without being removed, are passed through eddy current units 62 to separate non-ferrous metals 64. These materials are dried if necessary and delivered to suitable storage/transport containers 46.

The materials that pass through the non-ferrous metal separators, without being removed 68, are dried if necessary and delivered to a suitable storage/transport containers.

Heated, forced draft air handlers with controllable temperature and flow rates supply air for materials that need to be dried before storage or transporting. Additional controls to sense humidity may be used to affect the required drying operations with minimum energy consumption.

Suitable storage/transport containers 46 include cardboard gaylords, various types of supersacks and plastic or metal drums. In certain cases it may be possible to ship materials in bulk such as rail car or truck load lots.

The materials that pass through the non-ferrous metal separators, without being removed 68 are sent through a scrub 70, wash 72 and rinse 74. After dryer 76 the materials that pass through the non-ferrous metal separators, without being removed 68 are sent to a electrostatic sort 80 that split the material into plastic or rubber 82 and HIPS (high impact polystyrene) 84.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method of recycling printer cartridges comprising:
- feeding the cartridges into a hopper;
- bathing the cartridges in a liquid while the cartridges are in the hopper;
- moving the cartridges from the hopper to a grinder with an infeed conveyor;
- passing the cartridges though a double curtain of the liquid while on the infeed conveyor;
- delivering the wet cartridges from the infeed conveyor to the grinder;
- grinding the cartridges while wetted by the liquid in the grinder;
- outputting the ground or shredded cartridges to an oscillating screen;
- rinsing and sorting the ground cartridges through the oscillating screen along with excess fluid to remove the excess fluid and to separate materials, fine materials that pass through the screen are delivered into a flotation tank which floats light weight materials, the floating light weight material is regularly skimmed into a storage container, larger and heavier materials are regularly dumped from the oscillating screen onto an outfeed conveyor;
- isolating floating materials from non-floating materials with a flotation separator in the floatation tank with sluice gates;
- removing larger materials from the floatation tank with the outfeed conveyor as well as other materials that sink to the bottom of the tank;
- transporting the larger and heavier materials to several material separators by the outfeed conveyor, water is dispensed if necessary along the outfeed conveyor, the larger material on the outfeed conveyor at this point is plastics, ferrous metal and non ferrous metal; and
- drying the remaining non metal materials and delivering to a suitable storage container.

2. The method of recycling printer cartridges of claim 1 wherein the non metal materials are sent through a scrub, wash and rinse then a dryer, after dryer, the non metal materials are sent to a electrostatic sort that splits the non metal material into ABS and HIPS.

3. The method of recycling printer cartridges of claim 1 wherein the suitable storage containers are a selected one of cardboard gaylords, various types of supersacks, plastic drums, metal drums, rail car and truck load lots.

4. The method of recycling printer cartridges of claim 1 wherein the fluid is water.

5. The method according to claim 1, wherein the isolating floating materials includes separating the ferrous metal components by one or more magnetic assemblies through which the larger and heavier materials on the outfeed conveyor are passed.

6. The method according to claim 5, wherein the magnetic assemblies are a magnetic head and a rare earth head.

7. The method according to claim 5, wherein the separated ferrous metals are dried if necessary and delivered to a suitable storage container.

8. The method according to claim 1, wherein the isolating floating materials include separating the non-ferrous metals using eddy current units.

9. The method according to claim 8, wherein the non-ferrous metals are dried if necessary and delivered to a suitable storage container.

* * * * *